United States Patent
He et al.

(10) Patent No.: US 9,571,556 B2
(45) Date of Patent: Feb. 14, 2017

(54) BROWSER KERNEL ADAPTATION METHOD AND BROWSER THEREFOR

(71) Applicant: TENCENT TECHNOLOGY (SHENZHEN) COMPANY LIMITED, Shenzhen (CN)

(72) Inventors: Ming He, Shenzhen (CN); Lei Chen, Shenzhen (CN); Wenjun Gao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 350 days.

(21) Appl. No.: 14/255,294

(22) Filed: Apr. 17, 2014

(65) Prior Publication Data

US 2014/0258458 A1    Sep. 11, 2014

Related U.S. Application Data

(63) Continuation of application No. PCT/CN2012/077375, filed on Jun. 21, 2012.

(30) Foreign Application Priority Data

Oct. 20, 2011 (CN) .......................... 2011 1 0320373

(51) Int. Cl.
*G06F 15/16* (2006.01)
*H04L 29/08* (2006.01)
*G06F 17/30* (2006.01)

(52) U.S. Cl.
CPC ......... *H04L 67/02* (2013.01); *G06F 17/30899* (2013.01)

(58) Field of Classification Search
CPC ................... G06F 17/30905; G06F 17/30896; G06F 17/2247; G06F 17/211; G06F 17/30899; H04L 67/02; H04L 29/08
See application file for complete search history.

(56) References Cited

U.S. PATENT DOCUMENTS

| 6,610,105 B1 * | 8/2003 | Martin, Jr. ........ G06F 17/30905 707/E17.121 |
| 7,389,361 B2 * | 6/2008 | Major .............. G06F 17/30899 707/E17.119 |

(Continued)

FOREIGN PATENT DOCUMENTS

| CN | 101500002 A | 8/2009 |
| CN | 101655863 A | 2/2010 |

(Continued)

OTHER PUBLICATIONS

Korean Office Action.

(Continued)

*Primary Examiner* — Cheikh Ndiaye
(74) *Attorney, Agent, or Firm* — Dilworth & Barrese, LLP.

(57) ABSTRACT

The present disclosure, pertaining to the field of computer Internet, discloses a browser kernel adaptation method and a browser therefor. The method includes: receiving, by a browser, a request for browsing a page from a user; acquiring, by the browser, information of the page from a server according to the request, and determining the type of the page according to the information of the page; and selecting, by the browser, a browser kernel according to the type of the page, and processing the request by using the selected browser kernel. The browser includes: a receiving module, a determining module, and a selecting module. The present disclosure implements an automatic adaptation function of the browser kernel during page browsing, and solves the problem that the browser kernel in the prior art cannot be automatically adapted.

8 Claims, 3 Drawing Sheets

(56) References Cited

U.S. PATENT DOCUMENTS

| | | | |
|---|---|---|---|
| 2003/0046316 A1* | 3/2003 | Gergic | G06F 9/4443 |
| | | | 715/234 |
| 2004/0103374 A1 | 5/2004 | Chushima | |
| 2011/0157219 A1* | 6/2011 | Chakra | G06F 3/14 |
| | | | 345/619 |

FOREIGN PATENT DOCUMENTS

| | | |
|---|---|---|
| CN | 101150803 B | 8/2011 |
| CN | 102156709 A | 8/2011 |
| KR | 1020090116096 | 11/2009 |
| WO | 2010129394 A1 | 11/2010 |

OTHER PUBLICATIONS

Chinese Office Action.
English language translation of International Search Report from PCT/CN2012/077375.

* cited by examiner

BROWSER KERNEL ADAPTATION METHOD AND BROWSER THEREFOR

REFERENCE TO PRIOR APPLICATIONS

This application is a continuation of International Application No. PCT/CN2012/077375, filed Jun. 21, 2012, and claims priority to Chinese Patent Application No. 2011103203733, filed before the Chinese Patent Office on Oct. 20, 2011 and entitled "BROWSER KERNEL ADAPTATION METHOD AND BROWSER THEREFOR", the entire contents of each of which is incorporated herein by reference in its entirety.

TECHNICAL FIELD

The present disclosure relates to the field of computer and Internet technologies, and in particular, to a browser kernel adaptation method and a browser therefor.

BACKGROUND

During browsing web pages by using the browser on a mobile terminal, syntax of the web page is interpreted and the web page is rendered by the kernel of the browser. The browser kernel refers to a rendering engine employed by the browser, and the rendering engine determines displaying of web page content and format information of the page. Different browser kernels interpret the web page design syntax differently, and therefore, different rendering effects may be achieved for the same web page in the browsers with different kernels.

Currently, commonly used browser kernels include: the kernel provided by the developer of the browser, the kernel provided by the mobile terminal where the browser is installed, and the kernel of background transfer, which may also be considered as a cloud kernel. The browser of a current mobile terminal generally uses a default browser kernel to perform various operations, for example, the kernel provided by the developer of the default browser. In this case, the browser kernel is fixed, and cannot be automatically adapted during web page browsing by a user, thereby affecting user experience in using the browser.

SUMMARY

To solve the problem in the prior art, embodiments of the present disclosure provide a browser kernel adaptation method and a browser therefor. The technical solutions are as follows:

A browser kernel adaptation method includes:
receiving, by a browser, a request for browsing a page from a user;
acquiring, by the browser, information of the page from a server according to the request, and determining the type of the page according to the information of the page; and
selecting, by the browser, a browser kernel according to the type of the page, and processing the request by using the selected browser kernel.

The acquiring, by the browser, information of the page from a server according to the request, and determining the type of the page according to the information of the page, includes:
sending, by the browser, a Hypertext Transfer Protocol (HTTP) request message to the server according to the request, and receiving an HTTP response message returned by the server;
acquiring content type in the HTTP response message;
judging whether the content type is Wireless Markup Language (WML) or HyperText Markup Language (HTML);
if the content type is WML, determining that the page is of Wireless Application Protocol (WAP) type; and
if the content type is HTML, determining that the page is of WEB type.

Prior to the acquiring content type in the HTTP response message, the method further includes:
judging whether the HTTP response message contains the content type;
if the HTTP response message contains the content type, acquiring the content type in the HTTP response message; and
if the HTTP response message does not contain the content type, determining that the page is of unknown type.

The selecting, by the browser, a browser kernel according to the type of the page includes:
if the page is of WAP type, selecting a browser kernel provided by the developer of the browser; and
if the page is not of WAP type, selecting the browser kernel provided by the developer of the browser, or selecting a browser kernel provided by a mobile terminal where the browser is installed, or selecting background transfer.

The if the page is not of WAP type, selecting a browser kernel provided by the developer of the browser, or selecting a browser kernel provided by a mobile terminal where the browser is installed, or selecting background transfer, includes:
if the page is not of WAP type, judging whether a first data segment of the page is "<?xml":
if the first data segment is "<?xml", selecting the browser kernel provided by the developer of the browser;
if the first data segment is not "<?xml", judging whether the mobile terminal where the browser is installed is in World Wide Web (WWW) proxy mode;
if the mobile terminal is in WWW proxy mode, selecting the background transfer; and
if the mobile terminal is not in WWW proxy mode, selecting the browser kernel provided by the mobile terminal where the browser is installed.

A browser includes:
a receiving module, configured to receive a request for browsing a page from a user;
a determining module, configured to acquire information of the page from a server according to the request received by the receiving module, and determine the type of the page according to the information of the page; and
a selecting module, configured to select a browser kernel according to the type of the page determined by the determining module, and process the request by using the selected browser kernel.

The determining module includes:
a requesting unit, configured to send an HTTP request message to the server according to the request received by the receiving module, and receive an HTTP response message returned by the server;
an acquiring unit, configured to acquire content type in the HTTP response message received by the requesting unit; and
a determining unit, configured to judge whether the content type acquired by the acquiring unit is WML or HTML; if the content type is WML, determine that the page is of WAP type; and if the content type is HTML, determine that the page is of WEB type.

The acquiring unit is configured to judge whether the HTTP response message received by the requesting unit contains the content type; if the HTTP response message contains the content type, acquiring the content type in the HTTP response message; and if the HTTP response message does not contain the content type, determine that the page is of unknown type.

The selecting module includes:

a first selecting unit, configured to select a browser kernel provided by the developer of the browser if the determining module determines that the page is of WAP type; and a second selecting unit, configured to: if the determining module determines that the page is not of WAP type, select a browser kernel provided by the developer of the browser, or select a browser kernel provided by a mobile terminal where the browser is installed, or select background transfer.

The second selecting unit is configured to if the determining module determines that the page is of WEB type, judge whether a first data segment of the page is "<?xml"; if the first data segment is "<?xml", select the browser kernel provided by the developer of the browser; if the first data segment is not "<?xml", judge whether the mobile terminal where the browser is installed is in World Wide Web (WWW) proxy mode; if the mobile terminal is in WWW proxy mode, select the background transfer; and if the mobile terminal is not in WWW proxy mode, select the browser kernel provided by the mobile terminal Where the browser is installed.

The technical solutions provided in the embodiments of the present disclosure achieve the following beneficial effects:

Information of a page which is requested by a user for browsing is acquired, the type of the page is determined according to the acquired information, a suitable browser kernel is selected according to the type of the page, and the user's request for browsing the page is processed by using the selected browser kernel. This implements an automatic adaptation function of the browser kernel during page browsing, and solves the problem that the browser kernel in the prior art cannot be automatically adapted. With respect to a page of WAP type, the kernel provided by the developer of a lightweight browser is used for rendering, or with respect to a WWW proxy mode, background transfer is adapted, thereby saving traffic; or the kernel provided by a mobile terminal where the browser is installed is used for rendering, achieving a more vivid effect and greatly enhances user experience in using the browser.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art can derive other to accompanying drawings from these accompanying drawings without any creative efforts.

DETAILED DESCRIPTION

To make the objectives, technical solutions, and advantages of the present disclosure clearer, the embodiments of the present disclosure are described in detail below with reference to the accompanying drawings.

Figure 1:
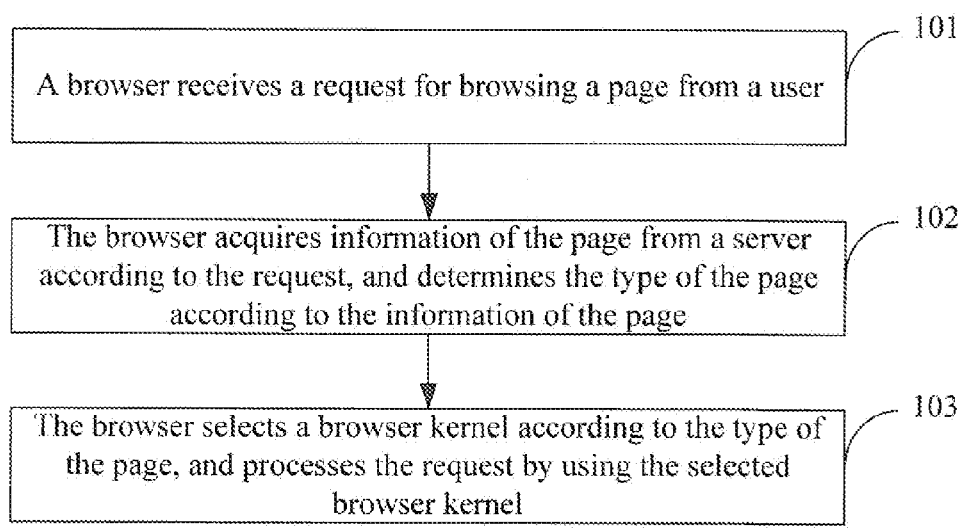
FIG. 1 is a flowchart of a browser kernel adaptation method according to an embodiment of the present disclosure.

Referring to FIG. 1, an embodiment of the present disclosure provides a browser kernel adaptation method, including:

101: A browser receives a request for browsing a page from a user.

102: The browser acquires information of the page from a server according to the request, and determines the type of the page according to the information of the page.

103: The browser selects a browser kernel according to the type of the page, and processes the request by using the selected browser kernel.

In this embodiment, the page refers to a hypermedia document on WWW, and is generally called a web page.

In this embodiment, step 102 may include:

sending, by the browser, an HTTP request message to the server according to the request, and receiving an HTTP response message returned by the server; acquiring content type in the HTTP response message; judging whether the content type is WML or HTML; if the content type is WML, determining that the page is of WAP type; and if the content type is HTML, determining that the page is of WEB type.

Further, prior to the acquiring content type in the HTTP response message, the method further includes:

judging whether the HTTP response message contains the content type; it the HTTP response message contains the content type, acquiring the content type in the HTTP response message; and if the HTTP response message does not contain the content type, determining that the page is of unknown type.

In this embodiment, the selecting, by the browser, a browser kernel according to the type of the page in step 103 may include:

if the page is of WAP type, selecting a browser kernel provided by the developer of the browser; and if the page is not of WAP type, selecting the browser kernel provided by the developer of the browser, or selecting a browser kernel provided by a mobile terminal where the browser is installed, or selecting background transfer.

Further, the if the page is not of WAP type, selecting a browser kernel provided by the developer of the browser, or selecting a browser kernel provided by a mobile terminal where the browser is installed, or selecting background transfer, includes:

if the page is not of WAP type, judging whether a first data segment of the page is "<?xml"; if the first data segment is "<?xml", selecting the browser kernel provided by the developer of the browser; if the first data segment is not "<?xml", judging whether the mobile terminal where the browser is installed is in World Wide Web (WWW) proxy mode; if the mobile terminal is in WWW proxy mode, selecting the background transfer; and if the mobile terminal is not in WWW proxy mode, selecting the browser kernel provided by the mobile terminal where the browser is installed.

The browser in this embodiment is generally installed in such a mobile terminal as mobile phone, and the like.

According to the method provided in this embodiment, information of a page which is requested by a user for browsing is acquired, the type of the page is determined according to the acquired information, a suitable browser kernel is selected according to the type of the page, and the user's request for browsing the page is processed by using the selected browser kernel. This implements an automatic adaptation function of the browser kernel during page browsing, and solves the problem that the browser kernel in the prior art cannot be automatically adapted.

Figure 2:
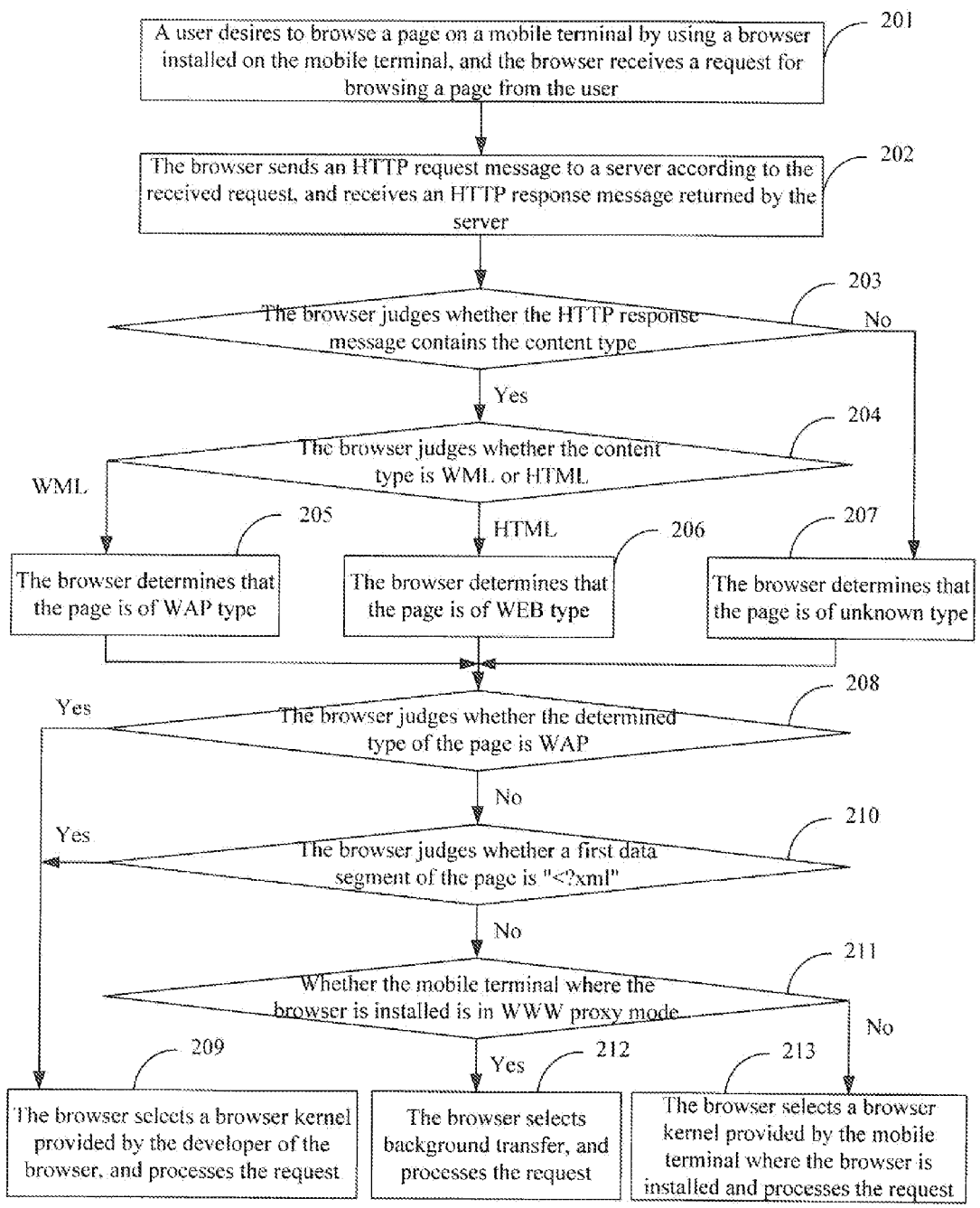
FIG. 2 is a flowchart of a browser kernel adaptation method according to an embodiment of the present disclosure.

Referring to FIG. 2, an embodiment of the present disclosure provides a browser kernel adaptation method, including:

201: A user desires to browse a page on a mobile terminal by using a browser installed on the mobile terminal, and the browser receives a request for browsing a page from the user.

202: The browser sends an HTTP request message to a server according to the received request, and receives an HTTP response message returned by the server.

The server refers to a server providing page services, for example, a website, and so on.

203: The browser judges whether the received HTTP response message contains content type; if the HTTP response message contains the content type, step 204 is performed; and otherwise, step 207 is performed.

The HTTP response message contains a header and a body, where the header optionally contains the content type for identifying the type of the page currently requested. The browser can acquire the content type from the HTTP response message.

204: The browser acquires the content type contained in the HTTP response message, judges whether the content type is WML or HTML; if the content type is WML, step 205 is performed; and if the content type is HTML, step 206 is performed.

The HTML, is a specification and also a standard, which marks, by using markup signs, various parts of a web page that are to be displayed, including text, pictures, and the like; and it may further creates web pages with more powerful functionality in combination with other Web technologies, such as script languages, Computer Graphics Interfaces (CGIs), and components etc. The browser kernel interprets and displays content marked by the markup signs according to the markup signs. Different browser kernels may interpret the same markup sign differently, Therefore, different display effects may be achieved.

The WML, developed from the HTML, is a markup language based on eXtensible Markup Language (XML), and generally used to create pages that can be displayed in a WAP browser. The WML is applied to standard narrow band devices, since the narrow frequency subjects the WML to partial restrictions, for example, smaller displays, a limited number of user input devices and narrow band network connections, and limited memory and resources.

A page designed using the HTML language may be read with such a browser on the computer as IE or Netscape. A page designed using the WML language is dedicatedly displayed on the screen of such a mobile terminal as mobile phone, and a user can browse the WML page on the mobile terminal by using the browser.

205: The content type is WML, and therefore the browser determines that the page is of to WAP type; and step 208 is performed.

A WEP page refers to a page designed by using the WAP technology. The WAP refers to Wireless Application Protocol, which is a global network communication protocol. The WAP is directed to introducing abundant information and advanced services on the Internet into wireless terminals. The WAP may convert information in the HTML language on the Internet into information in the WML language, and display the information on the screen of the mobile terminal. The WAP only needs supports of a mobile terminal and a WAP proxy server, instead of any modification of the current mobile communication network protocol. Therefore, the WAP may be widely applied in such various networks as Global System for Mobile communications (GSM), Code Division Multiple Access (CDMA), Time Division Multiple Access (TDMA), and 3G etc. The mobile terminal supporting the WAP technology may be used to browse Internet content described using WML.

206: The content type is WML, and therefore the browser determines that the page is of WEB type; and step 208 is performed.

The WEB is mainly directed to computers, which is graphical and simple for navigation. Therefore, the WEB is not only capable of integrating graphics, audio data, and video data, but also capable of browsing pages between Various pages on various websites by skipping from one connection to another. A page of WEB type generally has an address of WWW form, and can be accessed through the WWW address regardless of what system platform is used.

207: The HTTP response message does not contain the content type, and therefore the browser determines that the page is of unknown type; and step 208 is performed.

208: The browser judges whether the determined type of the page is WAP type; if the page is of WAP type, step 209 is performed: and otherwise, step 210 is performed.

209: The browser selects a browser kernel provided by the developer of the browser, and processes the request for browsing a page by using the selected browser kernel and the process ends.

In this embodiment, with respect to pages of WAP type, the browser kernel provided by the developer of the browser is selected, which is lightweight and suitable for mobile terminals.

210: The browser judges whether a first data segment of the page is "<?xml", if the first data segment is "<?xml", step 209 is performed; and otherwise, step 211 is performed.

If the first data on the page is "<?xml", the page is of WAP type. Generally, in a WAP page, version information and coding mode are described first. The first data segment is "<?xml". With respect to a page containing no content type, it may be determined whether the page is of WAP type according to the first data segment.

For example, the page includes "<?xml version="1.0" encoding="UTF-8"?>", where the first data segment is "<?xml", and it is thus determined that the page is of WAP type.

211: The browser judges whether a mobile terminal where the browser is installed is in WWW proxy mode; if the mobile terminal is in WWW proxy mode, step 212 is performed; and otherwise, step 213 is performed.

212: The browser selects background transfer, and processes the request for browsing a page by using the selected browser kernel; and the process ends.

The background transfer refers to acquiring related information of a page by a proxy server from a server providing page services. Generally, when a user acquires network information by directly connecting an Internet side using a browser, a server at the target site is connected directly, and then the information is transferred back by the server at the target site. The proxy server is a server defined as falling in between a client and a Web server. With the proxy server, the browser does not retrieve the page directly from the Web server, but sends a request to the proxy sever. Upon receiving the request, the proxy server retrieve information needed by the browser and transfers the information to the browser of the user. Most of the proxy servers have a buffer function, which are capable of storing newly acquired data into a memory. If the data needed by the browser has been stored in the memory thereof and is up to date, the browser does not need to acquire the data from the Web server, but directly transfers the data stored in the memory to the browser of the user. This notably improves browsing speed and efficiency, and saves traffic.

213. The browser selects a browser kernel provided by the mobile terminal where the browser is installed and processes the request for browsing a page by using the selected browser kernel; and the process ends.

Generally, the browser kernel provided by the mobile terminal achieves a more vivid page effect for the browser, and enhances user experience.

In this embodiment, if the mobile terminal where the browser is installed stores a WAP website white list, the method may further includes:

After receiving the request for browsing a page from the user, the browser firstly judges whether the requested page is recorded in the website white list; if the requested page is recorded in the website white list, it is determined that the page is of WAP type, and step 208 is performed, and otherwise, step 202 is performed. The WAP website while list records related information of specific pages. These pages are all of WAP page, and the recorded related information includes but not limited to Uniform Resource Locators (URLs), which is not limited in the present disclosure.

According to the method provided in this embodiment, information of a page which is requested by a user for browsing is acquired, the type of the page is determined according to the acquired information, a suitable browser kernel is selected according to the type of the page, and the user's request for browsing the page is processed by using the selected browser kernel. This implements an automatic adaptation function of the browser kernel during page browsing, and solves the problem that the browser kernel in the prior art cannot be automatically adapted. With respect to a page of WAP type, the kernel provided by the developer of a lightweight browser is used for rendering; or with respect to a WWW proxy mode, background transfer is adapted, thereby saving traffic; or the kernel provided by a mobile terminal where the browser is installed is used for rendering, achieving a more vivid effect and greatly enhances user experience in using the browser.

Figure 3:
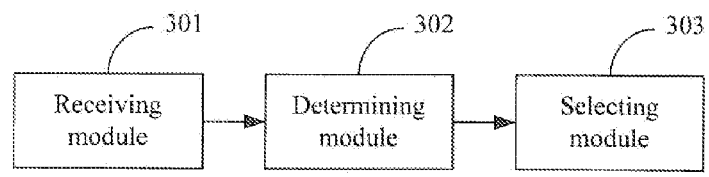
FIG. 3 is a structural diagram of a browser according to an embodiment of the present disclosure.

Referring to FIG. 3, an embodiment of the present disclosure provides a browser, including:

a receiving module 301, configured to receive a request for browsing a page from a user;

a determining module 302, configured to acquire information of the page from a server according to the request, and determine the type of the page according to the information of the page; and a selecting module 303, configured to select a browser kernel according to the determined type of the page, and process the request by using the selected browser kernel.

Figure 4:
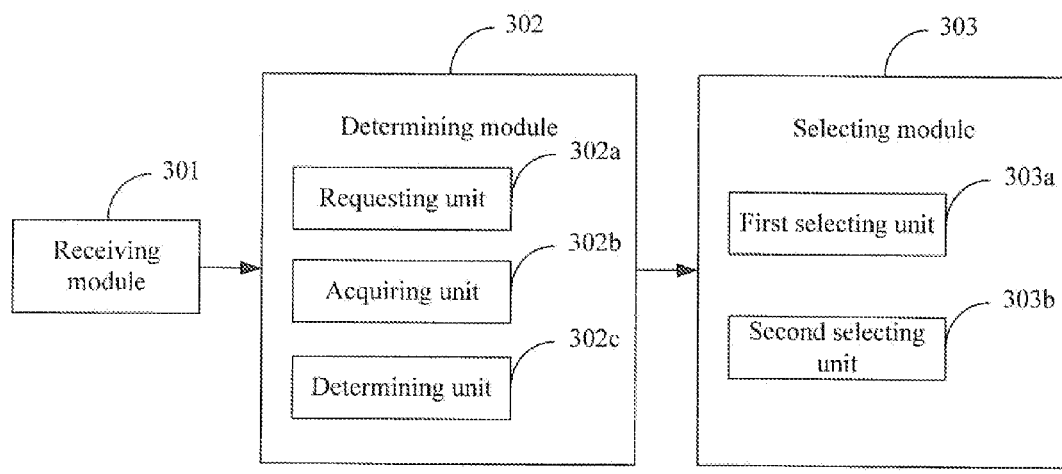
FIG. 4 is another structural diagram of the browser according to an embodiment of the present disclosure.

Referring to FIG. 4, in this embodiment, the determining module 302 may include:

a requesting unit 302a, configured to send an HTTP request message to the server according to the request, and receive an HTTP response message returned by the server;

an acquiring unit 302b, configured to acquire content type in the HTTP response message;

a determining unit 302c configured to judge Whether the content type is WML or HTML; if the content type is WML, determine that the page is of WAP type; and if the content type is HTML, determine that the page is of WEB type.

Further, the acquiring unit 302b may be specifically configured to judge whether the HTTP response message contains the content type; if the HTTP response message contains the content type, acquire the content type in the HTTP response message; and if the HTTP response message does not contain the content type, determine that the page is of unknown type.

In this embodiment, the selecting module 303 may include:

a first selecting unit 303a, configured to select a browser kernel provided by the developer of the browser if the page is of WAP type; and a second selecting unit 303b, configured to: select a browser kernel provided by the developer of the browser, or elect a browser kernel provided by a mobile terminal where the browser is installed, or select background transfer if the page is not of WAP type.

Further, the second selecting unit 303b may be specifically configured to if the page is of WEB type, judge whether a first data segment of the page is "<?xml"; if the first data segment is "<?xml", select the browser kernel provided by the developer of the browser; if the first data segment is not "<?xml", judge whether the mobile terminal where the browser is installed is in World Wide Web (WWW) proxy mode; if the mobile terminal is in WWW proxy mode, select the background transfer; and if the mobile terminal is not in WWW proxy mode, select the browser kernel provided by the mobile terminal where the browser is installed.

According to the browser provided in this embodiment, information of a page which is requested by a user for browsing is acquired, the type of the page is determined according to the acquired information, a suitable browser kernel is selected according to the type of the page, and the user's request for browsing the page is processed by using the selected browser kernel. This implements an automatic adaptation function of the browser kernel during page browsing, and solves the problem that the browser kernel in the prior art cannot be automatically adapted. With respect to a page of WAP type the kernel provided by the developer of a lightweight browser is used for rendering; or with respect to a WWW proxy mode, background transfer is adapted, thereby saving traffic; or the kernel provided by a mobile terminal where the browser is installed is used for rendering, achieving a more vivid effect and greatly enhances user experience in using the browser.

A person skilled in the art should understand that all or part of steps of the preceding methods may be implemented by hardware or hardware following instructions of programs. File programs may be stored in a computer readable storage medium and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A browser kernel adaptation method, comprising:
    receiving, by a browser, a request for browsing a page from a user;
    acquiring, by the browser, information of the page from a server according to the request, and determining the type of the page type according to the information of the page, the page type includes WAP type, WEB type, and unknown type; and selecting, by the browser, a browser kernel according to the type page type, when the page type is the unknown type, selecting the browser kernel in accordance with a first data segment of the page, and a mobile terminal mode; and processing the request by using the selected browser kernel, wherein if the page is not of WAP type, selecting a browser kernel provided by the developer of the browser, or selecting a browser kernel provided by a mobile terminal where the browser is installed, or selecting background transfer when the page is not of the WAP type, comprises:

if the page is not of the WAP type, judging whether the first data segment of the page is "<?xml";

if the first data segment is "<?xml", selecting the browser kernel provided by a developer of the browser;

if the first data segment is not "<?xml", judging whether the mobile terminal where the browser is installed is in World Wide Web (WWW) proxy mode;

if the mobile terminal mode is WWW proxy mode, selecting the background transfer; and if the mobile terminal mode is not WWW proxy mode, selecting the browser kernel provided by the mobile terminal where the browser is installed.

2. The method according to claim 1, wherein the acquiring, by the browser, information of the page from a server according to the request, and determining the type of the page according to the information of the page, comprises sending, by the browser, a HyperText Transfer Protocol (HTTP) request message to the server according to the request, and receiving an HTTP response message returned by the server;

acquiring content type in the HTTP response message;

judging whether the content type is Wireless Markup Language (WML) or HyperText Markup Language (HTML);

if the content type is WML, determining that the page is of Wireless Application Protocol (WAP) type; and if the content type is HTML, determining that the page is of WEB type.

3. The method according to claim 2, wherein prior to the acquiring content type in the HTTP response message, the method further comprises:

judging whether the HTTP response message contains the content type;

if the HTTP response message contains the content type, acquiring the content type in the HTTP response message; and if the HTTP response message does not contain the content type, determining that the page is of the unknown type.

4. The method according to claim 1, wherein the selecting, by the browser, a browser kernel according to the page type of the page comprises:

if the page is of the WAP type, selecting a browser kernel provided by the developer of the browser; and if the page is not of the WAP type, selecting the browser kernel provided by the developer of the browser, or selecting a browser kernel provided by a mobile terminal where the browser is installed, or selecting background transfer.

5. An apparatus for adapting a browser kernel, comprising:

at least a processor; and at least a computer readable storage medium containing instructions of programs executed by the processor, wherein the instructions comprises:

a receiving module, configured to receive a request for browsing a page from a user;

a determining module, configured to acquire information of the page from a server according to the request received by the receiving module, and determine the page type of the page according to the information of the page, the page type includes WAP type, WEB type, and unknown type; and a selecting module, configured to select a browser kernel according to the page type of the page determined by the determining module, when the page type is the unknown type, selecting the browser kernel in accordance with a first data segment of the page and a mobile terminal mode; and process the request by using the selected browser kernel, wherein the second selecting unit is configured to: if the determining module determines that the page is not of the WAP type, judge whether the first data segment of the page is "<?xml"; if the first data segment is "<?xml", select the browser kernel provided by a developer of the browser; if the first data segment is not "<?xml", judge whether the mobile terminal where the browser is installed is in World Wide Web (WWW) proxy mode; if the mobile terminal mode is WWW proxy mode, select a background transfer; and if the mobile terminal mode is not WWW proxy mode, select the browser kernel provided by the mobile terminal where the browser is installed.

6. The browser according to claim 5, wherein the determining module comprises:

a requesting unit, configured to send a HyperText Transfer Protocol (HTTP) request message to the server according to the request received by the receiving module, and receive an HTTP response message returned by the server;

an acquiring unit, configured to acquire content type in the HTTP response message received by the requesting unit; and a determining unit, configured to: judge whether the content type acquired by the acquiring unit is Wireless Markup Language (WML) or HyperText Markup Language (HTML); if the content type is WML, determine that the page is of Wireless Application Protocol (WAP) type; and if the content type is HTML, determine that the page is of WEB type.

7. The browser according to claim 6, wherein the acquiring unit is configured to: judge whether the HTTP response message received by the requesting unit contains the content type; if the HTTP response message contains the content type, acquire the content type in the HTTP response message; and if the HTTP response message does not contain the content type, determine that the page is of the unknown type.

8. The browser according to claim 5, wherein the selecting module comprises:

a first selecting unit, configured to select a browser kernel provided by the developer of the browser if the determining module determines that the page is of the WAP type; and a second selecting unit, configured to: if the determining module determines that the page is not of the WAP type, select a browser kernel provided by the developer of the browser, or select a browser kernel provided by a mobile terminal where the browser is installed, or select background transfer.

* * * * *